(12) United States Patent
Lapstun et al.

(10) Patent No.: US 7,289,882 B2
(45) Date of Patent: *Oct. 30, 2007

(54) ROBOT OPERATING IN ASSOCIATION WITH INTERFACE SURFACE

(75) Inventors: Paul Lapstun, Balmain (AU); Zhenya Alexander Yourlo, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 726 days.

This patent is subject to a terminal disclaimer.

(21) Appl. No.: 10/782,894

(22) Filed: Feb. 23, 2004

(65) Prior Publication Data

US 2004/0172166 A1 Sep. 2, 2004

(30) Foreign Application Priority Data

Feb. 26, 2003 (AU) .............................. 2003900861

(51) Int. Cl.
*G06F 19/00* (2006.01)
(52) U.S. Cl. .............. 700/245; 318/586.1; 318/568.12; 318/568.11
(58) Field of Classification Search ................ 700/245; 318/568.1, 568.11, 568.12
See application file for complete search history.

(56) References Cited

U.S. PATENT DOCUMENTS

| | | | |
|---|---|---|---|
| 4,566,032 A | 1/1986 | Hirooka et al. |
| 4,864,618 A | 9/1989 | Wright |
| 5,051,736 A | 9/1991 | Bennett et al. |
| 5,477,012 A | 12/1995 | Sekendur |
| 5,652,412 A | 7/1997 | Lazzouni |
| 5,661,506 A | 8/1997 | Lazzouni et al. |
| 5,692,073 A | 11/1997 | Cass |

(Continued)

FOREIGN PATENT DOCUMENTS

DE 203 04 906 6/2003

(Continued)

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

(Continued)

*Primary Examiner*—Thomas Black
*Assistant Examiner*—Marie A Weiskopf

(57) ABSTRACT

A robot is provided which is adapted to operate in association with an interface surface, which has disposed therein or thereon coded data indicative of an identity of the interface surface and of a plurality of reference points of the interface surface. The robot has movement means to allow the robot to move over the interface surface, a sensing device which senses at least some of the coded data and generates indicating data indicative of the identity of the interface surface and of a position of the robot on the interface surface, and communication means to transmit the indicating data to a computer system, which is programmed to select and execute a computer application based on at least the identity of the interface surface, and to receive movement instructions from the selected computer application. The behaviour of the robot is at least in part controlled by the selected computer application.

35 Claims, 6 Drawing Sheets

U.S. PATENT DOCUMENTS

| | | | |
|---|---|---|---|
| 5,852,434 A | 12/1998 | Sekendur | |
| 5,854,450 A * | 12/1998 | Kent | 178/18.04 |
| 6,061,064 A * | 5/2000 | Reichlen | 345/418 |
| 6,076,734 A | 6/2000 | Dougherty | |
| 6,256,560 B1 | 7/2001 | Kim et al. | |
| 6,470,235 B2 * | 10/2002 | Kasuga et al. | 700/246 |
| 6,584,376 B1 * | 6/2003 | Van Kommer | 700/245 |
| 6,964,374 B1 | 11/2005 | Djuknic et al. | |
| 7,148,644 B2 * | 12/2006 | Yourlo et al. | 318/568.11 |
| 2002/0120362 A1 * | 8/2002 | Lathan et al. | 700/245 |

FOREIGN PATENT DOCUMENTS

| | | |
|---|---|---|
| EP | 364 353 | 4/1990 |
| GB | 2259 823 | 3/1993 |
| GB | 2306669 | 5/1997 |
| GB | 2353909 | 3/2001 |
| JP | 08112397 A * | 5/1996 |
| WO | WO 99/18487 | 4/1999 |
| WO | WO 99/50787 | 10/1999 |
| WO | WO-01/06905 A | 2/2001 |
| WO | WO-01/15059 A | 3/2001 |
| WO | WO 01/71441 | 9/2001 |

OTHER PUBLICATIONS

Rupp, T. et al, Positioning and Communication System for Autonomous Guided Vehicles in Indoor Environment, Proc. 9th Mediterranean Electrotechnical Conference, 1998, vol. ,pp. 187-191.

Cord, T. et al, Error Control Navigation Codes for Autonomous Mobile Robots, Proc. IEEE International Conference on Intelligent Engineering System, 1997, pp. 141-146.

Schellwat, H. et al, Position Detection of an Autonomous Robot by Aperiodic Tilings Proc. Instrumentation and Measurement Technology Conference, 1997, vol. 1, pp. 576-580.

Couzijn, W.E.S., "Afstudeerproject 'Mobile Robot Chess Game'" Feedback Periodiek Van Het Genootschap Regeltechniek Ingenieurs (Online) Oct. 31, 1999, pp. 13-16, XP002367254 Delft Retrieved from the Internet: URL: <http://www.dcsc.tudelft.nl/Industrial/Grid/Feedback/fb_1999_2.pdf>[retrieved on Feb. 10, 2006], *the whole document*.

* cited by examiner

ROBOT OPERATING IN ASSOCIATION WITH INTERFACE SURFACE

TECHNICAL FIELD

The present invention relates to a robot, and in one particular form, to a mobile or moveable robot that can behave in a particular way in response to the particular surface upon which the robot is placed and the robot's position on that surface, and in another particular form, to a mobile or moveable robot adapted to mark a particular surface.

CO-PENDING APPLICATIONS

Various methods, systems and apparatus relating to the present invention are disclosed in the following co-pending applications filed by the applicant or assignee of the present invention simultaneously with the present application: NPS046US.

The disclosure of this co-pending application is incorporated herein by cross-reference. The application is temporarily identified by its docket number. This will be replaced by the corresponding application number when available.

CROSS-REFERENCES

Various methods, systems and apparatus relating to the present invention are disclosed in the following co-pending applications filed by the applicant or assignee of the present application:

| | | | | |
|---|---|---|---|---|
| 10/409,876 | 10/409,848 | 10/409,845 | 09/575,197 | 09/575,195 |
| 09/575,159 | 09/575,132 | 09/575,123 | 09/575,148 | 09/575,130 |
| 09/575,165 | 09/575,153 | 09/693,415 | 09/575,118 | 09/609,139 |
| 09/608,970 | 09/575,116 | 09/575,144 | 09/575,139 | 09/575,186 |
| 09/575,185 | 09/609,039 | 09/663,579 | 09/663,599 | 09/607,852 |
| 09/575,191 | 09/693,219 | 09/575,145 | 09/607,656 | 09/693,280 |
| 09/609,132 | 09/693,515 | 09/663,701 | 09/575,192 | 09/663,640 |
| 09/609,303 | 09/610,095 | 09/609,596 | 09/693,705 | 09/693,647 |
| 09/721,895 | 09/721,894 | 09/607,843 | 09/693,690 | 09/607,605 |
| 09/608,178 | 09/609,553 | 09/609,233 | 09/609,149 | 09/608,022 |
| 09/575,181 | 09/722,174 | 09/721,896 | 10/291,522 | 10/291,517 |
| 10/291,523 | 10/291,471 | 10/291,470 | 10/291,819 | 10/291,481 |
| 10/291,509 | 10/291,825 | 10/291,519 | 10/291,575 | 10/291,557 |
| 10/291,661 | 10/291,558 | 10/291,587 | 10/291,818 | 10/291,576 |
| 10/291,589 | 10/291,526 | 6,644,545 | 6,609,653 | 6,651,879 |
| 10/291,555 | 10/291,510 | 19/291,592 | 10/291,542 | 10/291,820 |
| 10/291,516 | 10/291,363 | 10/291,487 | 10/291,520 | 10/291,521 |
| 10/291,556 | 10/291,821 | 10/291,525 | 10/291,586 | 10/291,822 |
| 10/291,524 | 10/291,553 | 10/291,511 | 10/291,585 | 10/291,374 |
| NPA125US | 10/685,583 | NPA127US | 10/685,584 | NPA133US |
| 09/575,193 | 09/575,156 | 09/609,232 | 09/607,844 | 09/607,657 |
| 09/693,593 | NPB008US | 09/928,055 | 09/927,684 | 09/928,108 |
| 09/927,685 | 09/927,809 | 09/575,183 | 09/575,160 | 09/575,150 |
| 09/575,169 | 6,644,642 | 6,502,614 | 6,622,999 | 09/575,149 |
| 10/322,450 | 6,549,935 | NPN004US | 09/575,187 | 09/575,155 |
| 6,591,884 | 6,439,706 | 09/575,196 | 09/575,198 | 09/722,148 |
| 09/722,146 | 09/721,861 | 6,290,349 | 6,428,155 | 09/575,146 |
| 09/608,920 | 09/721,892 | 09/722,171 | 09/721,858 | 09/722,142 |
| 10/171,987 | 10/202,021 | 10/291,724 | 10/291,512 | 10/291,554 |
| 10/659,027 | 10/659,026 | 09/693,301 | 09/575,174 | 09/575,163 |
| 09/693,216 | 09/693,341 | 09/693,473 | 09/722,087 | 09/722,141 |
| 09/722,175 | 09/722,147 | 09/575,168 | 09/722,172 | 09/693,514 |
| 09/721,893 | 09/722,088 | 10/291,578 | 10/291,823 | 10/291,560 |
| 10/291,366 | 10/291,503 | 10/291,469 | 10/274,817 | 09/575,154 |
| 09/575,129 | 09/575,124 | 09/575,188 | 09/721,862 | 10/120,441 |
| 10/291,577 | 10/291,718 | 10/291,719 | 10/291,543 | 10/291,494 |
| 10/292,608 | 10/291,715 | 10/291,559 | 10/291,660 | 10/409,864 |
| 10/309,358 | 10/410,484 | NPW008US | NPW009US | 09/575,189 |
| 09/575,162 | 09/575,172 | 09/575,170 | 09/575,171 | 09/575,161 |
| 10/291,716 | 10/291,547 | 10/291,538 | 10/291,717 | 10/291,827 |
| 10/291,548 | 10/291,714 | 10/291,544 | 10/291,541 | 10/291,584 |
| 10/291,579 | 10/291,824 | 10/291,713 | 10/291,545 | 10/291,546 |
| 09/693,388 | 09/693,704 | 09/693,510 | 09/693,336 | 09/693,335 |
| 10/181,496 | 10/274,199 | 10/309,185 | 10/309,066 | NPW014US |
| NPS047US | NPS048US | NPS049US | NPS050US | NPS051US |
| NPS052US | NPS053US | NPS054US | | |

The disclosures of all of these co-pending applications are incorporated herein by reference. Some applications are temporarily identified by their docket number. This will be replaced by the corresponding application number when available.

BACKGROUND ART

Principles of mobile robotics are described in detail in Dudek, G., and M. Jenkin, *Computational Principles of Mobile Robotics* (Cambridge University Press, 2000) and Nehmzow, U., *Mobile Robotics: A Practical Introduction* (Springer Verlag, 2000). Practical mobile robot construction is described in detail in Wise, E., *Applied Robotics* (Prompt Publications, 1999) and McComb, G., *The Robot Builder's Bonanza*, 2nd Edition (McGraw Hill, 2001).

The present invention is not limited to use requiring a netpage. However, a netpage is now described to assist the reader in understanding the nature of the invention. A netpage consists of visible graphic data intended for human interpretation, as well as substantially invisible (or at least inconspicuous) netpage coded data intended for machine interpretation. The netpage coded data identifies, at each of at least a given density of points on the netpage, the identity of the netpage and the two-dimensional coordinates of the point. The given density is typically of the order of a few millimeters. A netpage sensing device incorporates an optical sensor and a decoder for netpage coded data. When placed in a position to sense netpage coded data, the netpage sensing device is able to determine the identity of the netpage and its own position relative to the netpage from a purely local snapshot of the netpage. Whereas the netpage coded data only directly encodes position to a certain precision (e.g. of the order of a few millimeters), the netpage sensing device can determine its position and orientation relative to the netpage to greater precision (e.g. of the order of a few micrometers) based on the alignment, rotation and perspective distortion of the coded data in its field of view.

Note that the distinction in a particular coding pattern between page identity (i.e. netpage id) and point coordinates is merely a functional distinction. An actual coding pattern may utilize any mixture (or hierarchy) of region identifiers and coordinates, ranging from a pure coordinate code where the coordinate space spans a multitude of pages, through to a pure identifier code where a page contains a multitude of identified regions. In the preferred coding, as described above, the coding pattern contains a multitude of identified regions, each containing a range of coordinates, and each conveniently corresponding to the size of a page. Note also that the size of a page is itself not fixed, and may correspond to the size of a sheet of paper (e.g. Letter/A4, Tabloid/A3, etc.), or to the size of the surface of an arbitrary object.

If the scale of the netpage coding pattern is increased (e.g. so that the given point density is of the order of centimeters or decimeters or larger), then the required imaging field of view grows accordingly. However, the precision with which the corresponding netpage sensing device can determine its precision and orientation relative to the netpage is a function of the device's imaging resolution, not the size of its field of view. It is therefore possible, given sufficient resolution, to determine position and orientation to arbitrary precision, independent of the scale of the netpage coding pattern, subject of course to normal optical imaging constraints such as diffraction limit.

A netpage may be printed onto a surface, such as the surface of a sheet of paper, using a netpage printer. Printing may take place in bulk, or on demand. The graphic data is typically printed using visible inks, such as cyan, magenta, yellow and black inks. The coded data is typically printed using an invisible ink such as an infrared-absorptive ink, or using a low-visibility ink.

More generally, the graphic data may be printed or otherwise deposited on or in the surface by any suitable device or process, and the coded data may be printed or otherwise deposited on or in the surface by any suitable process. The two devices and/or processes may be entirely unrelated, and need not operate simultaneously. It is within the scope of the present invention that the pattern of the coded data is represented in any way that allows it to be sensed, e.g. optically, magnetically, chemically, etc.

A netpage disposed on a surface is backed by a description of that netpage stored in a computer system, indexed by the netpage id. When a netpage sensing device interacts with a netpage, the sensing device forwards the details of the interaction to the computer system for interpretation with reference to the stored netpage description. The forwarded details typically include the decoded netpage id and the decoded position of the sensing device relative to the netpage. The details may also consist of a stream of netpage ids and positions. When the netpage sensing device is in the form of a writing implement or stylus, and the stream is therefore representative of motion of the writing implement or stylus relative to the netpage, the stream is referred to as digital ink. The netpage sensing device then typically incorporates a contact sensor, and is configured to begin generating the stream when it comes into contact with the surface, and cease generating the stream when contact with the surface is broken. Each digital ink stream delimited by a contact event and a loss of contact event is referred to as a stroke. The computer system retrieves the netpage description corresponding to the netpage id embedded in the stroke, and interprets the stroke with respect to the semantics of the netpage description. For example, if the netpage description describes a text field with a specific position and extent, the computer system may determine whether the stroke intersects the text field, and if so may interpret the stroke, in conjunction with other strokes similarly assigned to the text field, as handwritten text, and attempt to convert the strokes to a string of identified characters. If the netpage description describes an action zone (also referred to as a hyperlink) with a specific position and extent, the computer system may determine whether the stroke intersects the zone, and if so may interpret the stroke as invoking the action, which may in turn cause the computer system to send a corresponding message to another application associated with the action. Alternatively, a netpage stroke is forwarded directly to an application which is specific to the netpage id embedded in the stroke.

If the netpage sensing device incorporates a marking nib or printing device, then the computer system typically associates digital ink input from the device with the corresponding page by storing the digital ink in a persistent manner, indexed by the netpage id. In this way the digital ink can be reproduced when the page is re-printed, and can be searched.

A netpage sensing device in the form of a stylus and pen is described in co-pending PCT application WO 00/72230 entitled "Sensing Device, filed 24 May 2000; and co-pending US application U.S. Ser. No. 09/721,893 entitled "Sensing Device", filed 25 Nov. 2000. A netpage sensing device in the form of a viewer is described in co-pending PCT application WO 01/41046 entitled "Viewer with Code Sensor", filed 27 Nov. 2000.

Various netpage coding schemes and patterns are described in co-pending PCT application WO 00/72249 entitled "Identity-Coded Surface with Reference Points", filed 24 May 2000; co-pending PCT application WO 02/84473 entitled "Cyclic Position Codes", filed 11 Oct. 2001; co-pending US application U.S. Ser. No. 10/309358 entitled "Rotationally Symmetric Tags", and Australian Provisional Application 2002952259 entitled "Methods and Apparatus (NPT019)", filed 25 Oct. 2002.

The reference to any prior art in this specification is not, and should not be taken as, an acknowledgment or any form of suggestion that such prior art forms part of the common general knowledge.

DISCLOSURE OF INVENTION

In one aspect the present invention provides a robot adapted to operate in association with an interface surface having disposed therein or thereon coded data indicative of an identity of the interface surface and of a plurality of reference points of the interface surface, the robot comprising:
 (1) movement means to allow the robot to move over the interface surface;
 (2) a sensing device which senses at least some of the coded data and generates indicating data indicative of the identity of the interface surface and of a position of the robot on the interface surface;
 (3) communication means to:
  (A) transmit the indicating data to a computer system, the computer system programmed to select and execute a computer application based on at least the identity of the interface surface; and,
  (B) receive movement instructions from the selected computer application, whereby, the behaviour of the robot is at least in part controlled by the selected computer application.

In another aspect the present invention provides a robot adapted to operate in association with an interface surface having disposed therein or thereon coded data indicative of an identity of the interface surface and of a plurality of reference points of the interface surface, the robot comprising:
 (1) movement means to allow the robot to move over the interface surface;
 (2) a sensing device which senses at least some of the coded data and generates indicating data indicative of the identity of the interface surface and of a position of the robot on the interface surface;
 (3) a processor adapted to:
  (A) select and execute a computer application based on at least the identity of the interface surface; and,
  (B) generate movement instructions;

whereby, the behaviour of the robot is at least in part controlled by the selected computer application.

In a further aspect the present invention provides a robot adapted to operate in association with an interface surface having disposed therein or thereon coded data indicative of an identity of the interface surface and of a plurality of reference points of the interface surface, the robot comprising:
(1) at least one motor and at least one drive mechanism to propel the robot over the interface surface;
(2) at least one motor controller to control the motor;
(3) a sensing device which senses at least some of the coded data and generates indicating data indicative of the identity of the interface surface and of a position of the robot on the interface surface;
(4) a radio transceiver to:
  (A) transmit the indicating data to a computer system, the computer system programmed to execute a program based on at least the identity of the interface surface; and,
  (B) receive movement instructions from the program;
whereby, the behaviour of the robot is substantially controlled by the program.

29. The robot as claimed in claim 28, wherein the program is selected from a plurality of programs on the computer system.

In a further aspect the present invention provides a robot adapted to operate in association with an interface surface having disposed therein or thereon coded data indicative of an identity of the interface surface and of a plurality of reference points of the interface surface, the robot comprising:
(1) at least one motor and at least one drive mechanism to propel the robot over the interface surface;
(2) at least one motor controller to control the motor;
(3) a sensing device which senses at least some of the coded data and generates indicating data indicative of the identity of the interface surface and of a position of the robot on the interface surface;
(4) a processor to:
  (A) select and execute a program based on at least the identity of the interface surface; and,
  (B) generate movement instructions;
whereby, the behaviour of the robot is substantially controlled by the program.

In a further aspect the present invention provides a system for controlling the movement of a robot, the system comprising:
(1) an interface surface having disposed therein or thereon coded data indicative of an identity of the interface surface and of a plurality of reference points of the interface surface;
(2) a computer system, the computer system programmed to select and execute a computer application based on at least the identity of the interface surface, the computer system able to communicate with the robot;
(3) the robot adapted to operate in association with the interface surface, the robot including:
  (A) movement means to allow the robot to move over the interface surface;
  (B) a sensing device which senses at least some of the coded data and generates indicating data indicative of the identity of the interface surface and of a position of the robot of the interface surface; and,
  (C) communication means to transmit the indicating data to the computer system and receive movement instructions from the selected computer application;
whereby, the behaviour of the robot is at least in part controlled by the selected computer application.

In another aspect the present invention provides a method of controlling the movement of a robot, the robot adapted to operate in association with an interface surface having disposed therein or thereon coded data indicative of an identity of the interface surface and of a plurality of reference points of the interface surface, the robot additionally provided with movement means to allow the robot to move over the interface surface and a sensing device which senses at least some of the coded data and generates indicating data indicative of the identity of the interface surface and of a position of the robot on the interface surface, the method including the steps of:
  the robot transmitting the indicating data to a computer system, the computer system programmed to select and execute a computer application based on at least the identity of the interface surface; and,
  the robot receiving movement instructions from the selected computer application.

In a further aspect the present invention provides a method of controlling the movement of a robot, the robot adapted to operate in association with an interface surface having disposed therein or thereon coded data indicative of an identity of the interface surface and of a plurality of reference points of the interface surface, the robot additionally provided with movement means to allow the robot to move over the interface surface and a sensing device which senses at least some of the coded data and generates indicating data indicative of the identity of the interface surface and of a position of the robot on the interface surface, the method including the steps of:
  the robot processing the indicating data in a processor, the processor executing a program based on at least the identity of the interface surface; and,
  the processor providing movement instructions from the program.

In a second aspect the present invention provides a robot adapted to operate in association with an interface surface having disposed therein or thereon coded data indicative of a plurality of reference points of the interface surface, the robot comprising:
  movement means to allow the robot to move over the interface surface;
  a sensing device which senses at least some of the coded data and generates indicating data indicative of a position of the robot on the interface surface;
  communication means to transmit the indicating data to a computer system running a computer application, and to receive movement instructions from the computer application; and,
  a marking device adapted to selectively mark the interface surface in response to marking instructions received from the computer application.

In a further aspect the present invention provides a system for marking an interface surface by controlling a robot provided with means to mark the interface surface, the system comprising:
  the interface surface, having disposed therein or thereon coded data indicative of a plurality of reference points of the interface surface, thereby facilitating the robot to operate in association with the interface surface;
  the robot, provided with movement means to allow the robot to move over the interface surface, and a sensing device which senses at least some of the coded data and generates indicating data indicative of a position of the robot on the interface surface, and a marking device adapted to mark the interface surface; and, a computer system running a computer application, the computer system in communication with the robot, the computer application adapted to receive the indicating data and to transmit movement instructions and marking instructions to the robot.

In another aspect the present invention provides a method of marking an interface surface by controlling a mobile robot adapted to mark the interface surface, the robot additionally adapted to operate in association with the interface surface having disposed therein or thereon coded data indicative of a plurality of reference points of the interface surface, the method including the steps of:

the robot sensing at least some of the coded data and generating indicating data indicative of a position of the robot on the interface surface;

the robot transmitting the indicating data to a computer system running a computer application;

the robot receiving movement instructions from the computer application; and, the robot receiving marking instructions from the computer application to selectively mark the interface surface.

BRIEF DESCRIPTION OF FIGURES

The present invention should become apparent from the following description, which is given by way of example only, of a preferred but non-limiting embodiment thereof, described in connection with the accompanying figures.

MODES FOR CARRYING OUT THE INVENTION

Figure 1:
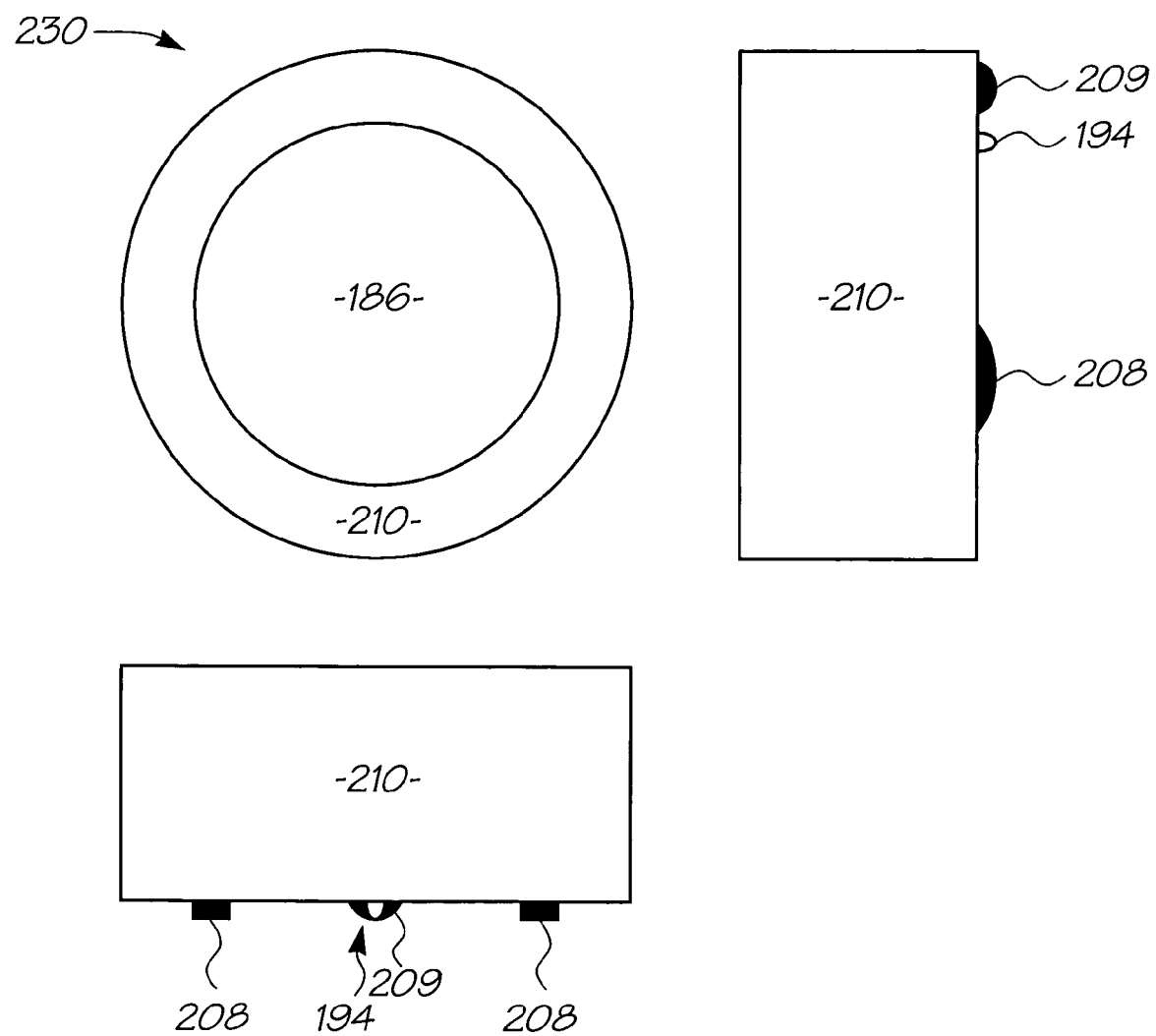
FIG. 1 shows a plan view and two elevations of a mobile robot 230 according to a preferred form of the present invention.

The following modes are described in order to provide a more precise understanding of the subject matter of the present invention.

In the figures, incorporated to illustrate the features of the present invention, like reference numerals are used to identify like parts throughout the figures.

Robot with Code Sensor

A mobile robot is typically an electromechanical device incorporating a controller and a steerable propulsion system. It may incorporate sensors for reacting to its environment. For example, it may incorporate one or more contact sensors so that when it bumps into an obstacle it can take remedial action such as reversing and proceeding in a different direction. A more sophisticated mobile robot may have access to a map of its environment, and may navigate from one point to another with reference to the map. It may also create a map of its environment during its explorations, either via its contact sensors, or via a more sophisticated sensory or vision system. Principles of mobile robotics are described in detail in Dudek, G., and M. Jenkin, *Computational Principles of Mobile Robotics* (Cambridge University Press, 2000) and Nehmzow, U., *Mobile Robotics: A Practical Introduction* (Springer Verlag, 2000), the contents of both of which are incorporated herein by cross-reference. Practical mobile robot construction is described in detail in Wise, E., *Applied Robotics* (Prompt Publications, 1999), and McComb, G., *The Robot Builder's Bonanza* (Second Edition, McGraw Hill, 2001), the contents of both which are incorporated herein by cross-reference.

Figure 2:
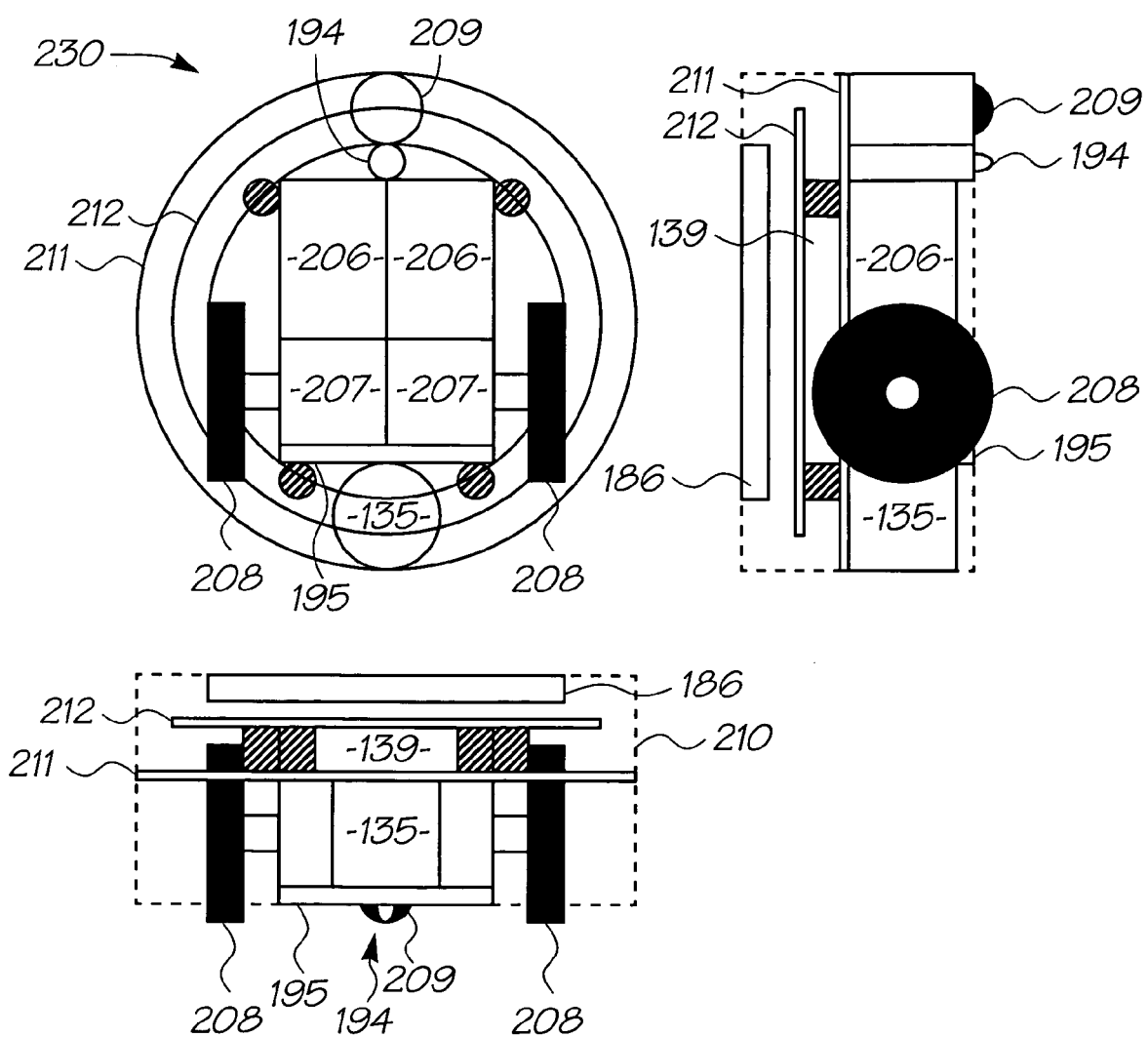
FIG. 2 shows a plan view and two elevations of the internal mechanical structure of the mobile robot 230 of FIG. 1.

The robot 230, a preferred form of which is illustrated in FIG. 1 and FIG. 2, is a mobile robot incorporating a differential drive system steered by an on-board controller 200 and is hereinafter refered to as a netpage robot. The drive system includes a pair of DC motors 206, with each motor coupled to a wheel 208 via a gearbox 207. Each motor is controlled by a motor controller 205, such as a discrete or integrated H-bridge to provide direction and braking control, and a pulse-width modulator to provide speed control. The drive system may alternatively utilize a pair of stepper motors 206, in which case each motor controller 205 generates the appropriate pulse sequences to control the speed and direction of its corresponding stepper motor. A castor 209 provides a third point of support for the robot. The robot incorporates a platform 211 to which the motors and gearboxes are attached, and which is itself attached to the robot housing 210 (shown enclosing the robot in FIG. 1 and in outline in FIG. 2). The platform 211 also supports the main PCB 212 which holds the controller 200 and other electronic components.

The netpage robot has a wireless communications link to a host computer system. It utilizes a radio transceiver 189 (e.g. operating according to a short-range standard such as Bluetooth, or a longer-range standard such as GSM, GPRS or other CDMA variant). Alternatively it may utilize an infrared transceiver (e.g. operating according to the IrDA standard). It is powered by a rechargeable battery 139.

When placed on a netpage, the netpage robot 230 determines, via its in-built netpage sensor, the id 50 of the netpage and its own position (and orientation) 221 relative to the netpage. It then reports this information to the host computer via the communications link. The netpage sensor incorporates infrared illumination LED(s) 131, an area image sensor 132, and optics 135 including an infrared filter, aperture and focussing optics. The robot detects contact with a surface via contact switch 194, or alternatively by successfully sensing and decoding the surface coding pattern.

The robot has a unique id 220 which it communicates to the host and which identifies it uniquely among netpage robots. The robot is responsive to a command 222 from its host to move to a specified position on a specified netpage. When the robot reaches its target position it reports its arrival to the host. Because the robot receives continuous position information from its netpage sensor, it is able to navigate with absolute accuracy, without the cumulative errors which plague odometry systems (due to such things as wheel slip and inaccurate kinematic modelling), and therefore without the need to include more sophisticated position-correction mechanisms.

To allow the robot to move with maximum efficiency, a movement command is usefully specified in terms of a polyline or piece-wise curve. This allows the robot to follow a multi-segment path without slowing to a stop between segments. The robot may also be responsive to overlapped commands, where it is able to receive and buffer one or more new commands before completing a current command. In the case of a polyline, the robot may optionally be instructed to interpolate a smooth curved path through the vertices of the polyline.

Commands to the robot may specify speed, or the robot may be allowed to choose its own speed according to its capabilities and the complexity of the path. If the speed is specified, then the polyline (or piece-wise curve) may contain a number of speed specifications (e.g. at each vertex), which are interpolated by the robot.

The size of the netpage robot may vary from small (e.g. millimeter or centimeter scale) to large (e.g. decimeter or meter scale). The netpage coded data pattern may be scaled to match the scale and intended applications of the robot. However, a single coded data pattern scale may be used across the full range of robot scales.

Page-Driven Robot Behavior

For the purposes of the following discussion, the game of chess is used for illustrative purposes. Note, however, that the principles are general and apply to games other than chess, and to applications beyond games.

Figure 3:
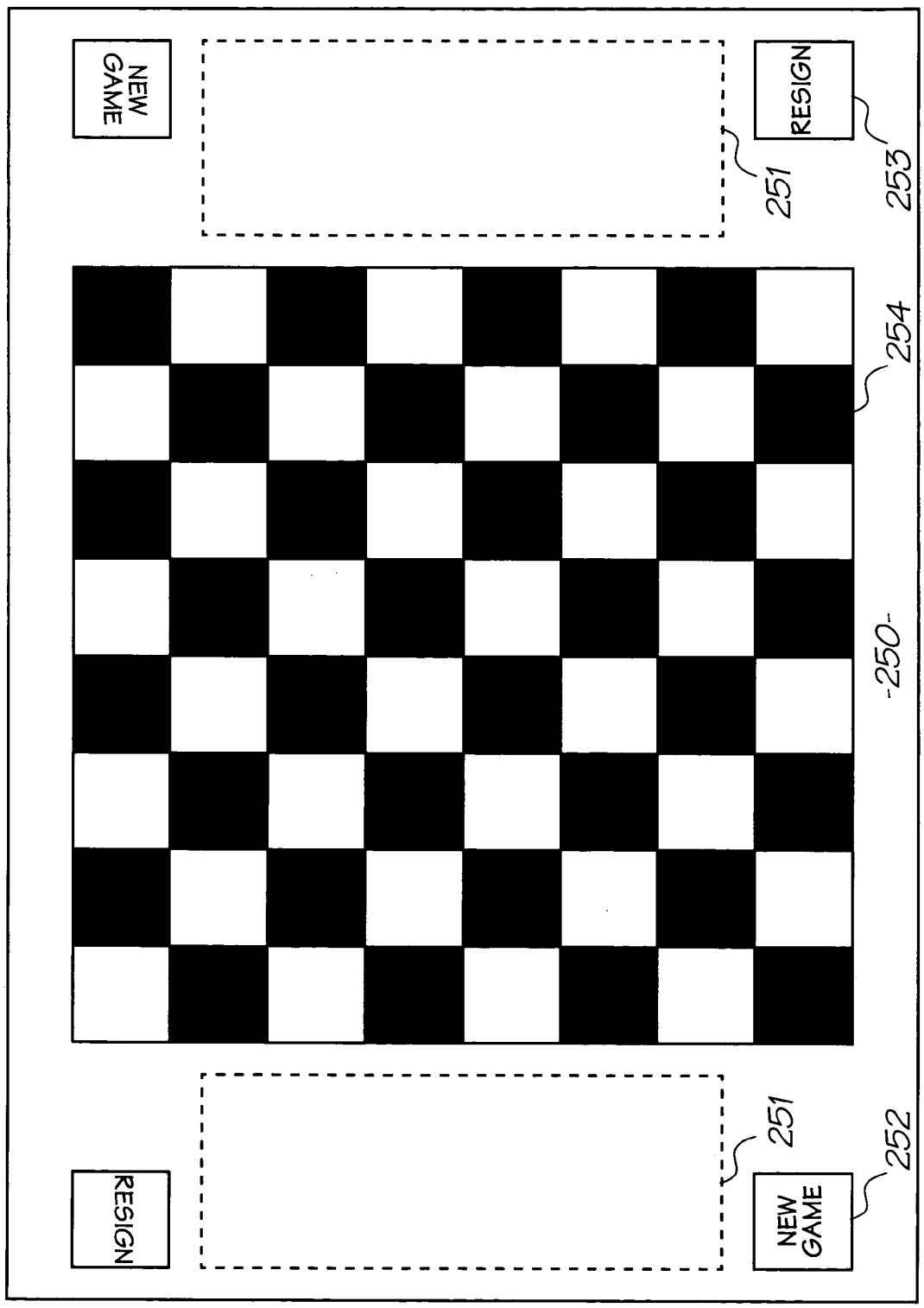
FIG. 3 shows a layout of an interactive printed chess board 250 according to a preferred form of the present invention.

The netpage chess board 250, as shown in FIG. 3, may be pre-made or may be printed on demand using a netpage printer. The board incorporates a playing area 254, consisting of an 8×8 checkerboard pattern, as well as additional areas and controls. When a netpage robot is placed on the netpage chess board, it initially reports its own position and orientation and the netpage id 50 of the netpage chess board to the host computer. The page server 841 on the host computer identifies the chess application associated with the netpage id of the netpage chess board (or associated with a zone of a field embedded in the netpage description associated with the netpage id), and forwards all robot input to the chess application. The host computer also forwards robot control commands from the chess application to the robot. The chess application may be local to the host computer, or may be executing on a different computer on a local-area or wide-area network (e.g. the Internet).

Since chess involves sixteen pieces, the chess application receives sixteen initial position reports from sixteen participating robots. If it receives less than sixteen initial position reports then it can signal an error to the user, e.g. via an audible or printed output. If it receives more than sixteen initial position reports, then it can instruct the redundant robots to move off the chess board. The chess application assigns each robot the role of one of the sixteen chess pieces, and instructs each robot to move to its starting position. The chess application must plan each robot's path to avoid collisions with other robots. For chess, a simple heuristic consists of the following:

assign each back-line (i.e. non-pawn) role to the nearest robot assign each front-line (i.e. pawn) role to the nearest remaining robot move to its starting position any robot not yet in its starting position which has an un-obscured straight-line view of its starting position repeat until all pieces are properly positioned or no more pieces can be moved move any remaining pieces using two-part moves.

Clearly more sophisticated algorithms are possible, many of which result in more rapid positioning.

The user makes a move by picking up a robot and placing it at a new position. The robot reports its new position to the chess application. If the move is the first move of a game then the "color" of the robot determines whether the user has chosen to play as white or black. Each robot ideally incorporates some kind of display 186 to indicate which role it has been assigned (e.g. white queen or black king). The display may be in the form of a small alphanumeric LCD showing an alphanumeric representation of the role, or a monochrome or color bit-mapped LCD or OLED showing an icon of the role. The robot is responsive to a command from the host (i.e. from the chess application via the host) to program the content of the robot's display. The robot may have multiple displays. For example it may have one display on its top and another on its face. Its entire visible surface may be completely covered by one or more displays, allowing a semi-three-dimensional icon to be displayed on the robot.

The chess application may chose to position the moved robot more centrally in its square, to allow more uniform navigation of other robots. It may also normalize its orientation, so that it is always facing the opposition. If the move is illegal, or if the user mistakenly moves an opposing piece, then the chess application can issue a spoken warning (e.g. via the robot's speaker 204, display 186, or status LED(s) 116) and reverse the move. If a piece is accidentally placed off the board, then the chess application can once again issue a warning.

The chess application then computes its responding move, and instructs one or more of its robots to move accordingly. Chess-playing algorithms and software are described in detail in Pawlak, R. J., *Chess Software Sourcebook* (Treehaus Books, 1999) and Heinz, E. A., *Scalable Search in Computer Chess: Algorithmic Enhancements and Experiments at High Search Depths* (Morgan Kaufmann, 1999), the contents of both of which are incorporated herein by cross-reference.

The user can also play against a remote human opponent, in which case each local move by the user is tracked by the chess application, and is mirrored, under chess application control, by the corresponding remote piece.

In the case of pieces which are allowed to move despite being hemmed in, such as knights, or pieces which are allowed to move diagonally, such as bishops and queens, the chess application may temporarily move offending robots out of the way, irrespective of their color. It may also temporarily move robots off the playing area 254, e.g. during castling. The chess application maintains a map of the chess board for navigation purposes. This may be the same map it uses for game-playing purposes, or separate from it. When the user captures an opposing piece s/he simply places the piece off the playing area. When the chess application captures an opposing piece (i.e. one of the user's pieces), it instructs the piece to move off the playing area. The chess board includes an area 251 for out-of-play pieces of each color. The chess application can automatically move a piece captured by the user to the out-of-play area, irrespective of where on the board the user places the piece after capture. If the chess board is upset and some pieces lose their places, then the chess application can automatically return each piece to its proper place. Alternatively the chess board can include a <resume> zone (not shown) which, when activated by the user with a piece (or other netpage sensing device), can instruct the chess application to return each piece to its proper place. To allow the user to resign, the chess board includes a <resign> zone 253 which, when activated by the user with a piece (or other netpage sensing device), or specifically with the resigning king, signals the chess application that the user is resigning. The chess application signals that it is resigning by moving its king off the playing area, or specifically to its own <resign> zone. The board also includes a <new game> zone 252 which, when activated by the user with a piece (or other netpage sensing device), signals the chess application to abandon the current game and set up a new game. There may be multiple <new game> zones corresponding to different levels of game-play by the chess application, e.g. ranging from beginner through intermediate to advanced.

When a pawn reaches the opposing back line and is transformed into a queen, the chess application re-assigns the role of the robot, and updates the robot's display(s) accordingly.

The netpage robot bay holds a number of netpage robots. The surface of the bay is netpage position-coded to allow robots to navigate into and within the bay under host control. The bay incorporates a netpage sensor which allows it to detect when and where it is placed on a netpage, and a communications link to the host computer which allows it to report the id of the netpage it is placed on and its own position and orientation relative to the netpage. When the bay is placed on a netpage on which one or more netpage robots are located, the host computer can automatically instruct the robots to enter the bay. To this end the bay has a gentle ramp at its entry which a netpage robot is able to navigate. The chess board (or bay, or both) may also include a <gather> zone which, when activated by the user with a piece (or other netpage sensing device), signals the host to gather the robots in the bay.

The netpage robot bay incorporates a battery charging circuit for re-charging the batteries of the robots in the bay. The bay has an external power connection, and may incorporate a larger storage battery for offline operation. A robot may be automatically re-charged in the bay, or may recharge in response to a re-charge instruction from the host.

The netpage robot may additionally incorporate a directional contact sensor, allowing it to detect and report to the host the presence of any unexpected obstacles. Such obstacles are "netpage-invisible" if they do not themselves incorporate netpage sensors or do not report their presence (and position) to the host. Any netpage robot is by definition netpage-visible and can therefore not become an unexpected obstruction.

To support games such as checkers which allow pieces to be stacked, the netpage robot is designed to be stacked. To this end its top surface is surrounded by a rim which is designed to mate with the undercarriage of another robot (this detail is not included in FIG. 1 and FIG. 2).

To support games such as checkers and go which only involve two kinds of pieces, the netpage robot may incorporate a simpler display or indicator system (such as an LED or a two-color LED), which can indicate which of the two roles the robot has been assigned.

There are many alternatives to the architecture described above, i.e. where a host computer mediates communication between robots and a (possibly remote) chess application. For example, one of the robots may be automatically designated as the master robot for the duration of the game (or longer), and may download the chess application for execution on its embedded processor. In this case the master robot controls the slave robots. As another example, the robots may act as peers, and may each download the chess application (or parts of it) and execute it collaboratively, communicating directly among themselves.

The key feature of the netpage robot system architecture is that the behavior of a collection of one or more robots derives from the particular netpage on which they are placed. When placed on a chess board the robots behave as chess pieces; when placed on a checkers board they behave as checkers pieces; etc. This is enabled by the netpage id (either directly or indirectly) identifying the application, the application controlling the robots (either remotely or embedded), and the robots navigating absolutely using the netpage position coding.

Marking Robot

The netpage robot may incorporate a marking device for marking a surface such as a paper surface. The marking device is under robot control, so that the robot can turn marking on and off in a position-dependent way. This may be effected using a digitally-controlled marking device 195 such as a Memjet™ printhead, or with a more traditional pen which can be moved into contact with the surface under robot control. The robot can support multiple colors via a multi-color printhead, or via multiple printheads, or via multiple colored pens. Suitable linear printheads are described in co-pending PCT applications WO 01/89839 entitled "Ink Jet Printhead Having a Moving Nozzle with an Externally Arranged Actuator", filed 19 Oct. 2001, WO 01/89844 entitled "Ink Jet Printhead Nozzle Array", filed 24 May 2000, and related applications incorporated by cross-reference therein and herein. Suitable circular printheads are described in co-pending PCT application WO 02/34531 entitled "Printhead for Pen", filed 19 Oct. 2001.

Multiple robots can also be used, each carrying a differently-colored pen. These can be controlled sequentially or simultaneously to draw different parts of a multi-colored drawing.

When the user inserts a new pen cartridge into a robot, the robot may automatically determine the color of the pen by decoding a barcode on the surface of the cartridge, or by reading a value from a solid-state memory embedded in the cartridge. Alternatively, the user may activate a color-coded netpage hyperlink using the robot (or other netpage sensing device), thus notififying the computer system and/or corresponding application of the robot's new pen color. A palette of such color-coded hyperlinks may be provided on a separate general-purpose netpage or may be incorporated into the design of an application-specific netpage.

The marking robot may incorporate one or more printheads with a significant width, e.g. of the order of the diameter of the robot itself (as shown in FIG. 2). This allows the robot to draw lines with subtle structure, such as varying width and varying color texture. It also allows the robot to operate in raster mode, as opposed to (or in addition to) the vector mode described so far. In raster mode the robot can transfer a two-dimensional image to a surface in a single sweep, or build up a larger image in multiple sweeps. The source image may be a bit-mapped image such as a photograph, or it may be a set of vector strokes, e.g. corresponding to handwritten text. Reproducing handwritten text in raster mode may be significantly faster than reproducing it in vector mode, particularly if the height of the text is less than the width of the printhead(s). In raster mode the computer system (or the robot) keeps track of exactly which parts of the source image have been transferred to the surface, allowing the robot to transfer the image to the surface without gaps or overlaps between successive sweeps.

The marking robot, in addition to being responsive a command from its host to move to a specified position on a specified netpage, is also responsive to a command from its host to draw a line of a specified color while moving to the target position. As before, the host mediates communication between the robot and an application which is specific to the netpage (or netpage region) on which the marking robot is placed. The host may hide the drawing functions of the robot behind a line-drawing interface which it presents to the application. The application is then unaware of how the drawing functions are implemented. The robot may directly support the drawing of curved lines, i.e. during movement along curved paths, or the application (or host) may approximate curved lines by instructing the robot to draw a succession of shorter straight-line segments.

The line-drawing interface, or the robot itself, may be responsive to PostScript drawing commands (refer to Adobe Systems Incorporated, *PostScript Language Reference* (3rd Edition, Addison-Wesley 1999), the contents of which are incorporated herein by cross-reference).

When the marking robot marks a netpage, the markings persist as part of the netpage in the usual way. In this way they become persistent, reproducible, and searchable.

Applications of the marking robot include (but are not limited to): pure plotting of drawings, particularly where it is impractical for the user to utilize a large-format printer, but it is practical for the user to obtain a large-format pre-netpage-coded "blank"; collaborative markup, where each participant's contribution, typically hand-drawn or handwritten with a netpage pen, is robotically mirrored on each of the other participants' "work-in-progress" netpages; and system feedback in the absence of a page-oriented printer.

Remote Conferencing and Collaborative Markup

As described in the context of the chess application, when the user places one or more robots on a collaborative markup netpage the corresponding collaborative markup application can automatically assign each of the robots to represent one of the remote collaborative participants. If names, icons and/or photos representing the participants are available, then this information can be displayed on the robots. In the limit case, each robot's display can act as a video conferencing display for the remote participant it represents, i.e. continuously displaying video of the remote participant captured remotely via a video camera and transmitted over the network. The robot may also usefully incorporate a speaker 204 for relaying the remote participant's voice, and a microphone 201 for capturing voice input. The microphone may also be provided separately, e.g. attached to the host computer (or to the relay—see below).

A remote conferencing netpage application is described in co-pending PCT application WO 01/02940 entitled "Method and System for Conferencing", filed 30 Jun. 2000. A collaborative document markup netpage application is described in co-pending PCT application WO 01/02939 entitled "Method and System for Collaborative Document Markup", filed 30 Jun. 2000.

Mirroring Robot Movement

In the same way that a netpage robot can mirror the movement of a remote user's netpage pen, a robot can mirror the movement of a remote robot. The remote robot may be under direct or indirect user control, i.e. it may be being moved by the user's own hand, or it may be being moved under interactive computer control. For example, in an interactive tank game being played by multiple remote participants, each user may control their local tank via a graphical user interface on a PC. The tank may include a video camera for capturing a tank's-eye view of the game environment, and the video can be shown on the user's PC display together with various tank navigation controls. Alternatively the video can be shown on a conventional television set receiving the video wirelessly from the tank, independently of the computer system. In this case the user can also control the tank via a printed netpage tank control user interface and a netpage stylus, i.e. without any direct interaction between the user and a PC.

Each user may have an additional local tank robot representing each remote user's tank. Each such tank simply mirrors the corresponding remote tank's movements, under the control of the network-resident tank game application.

The robots may have a game-specific shape (such as the shape of a tank), or may be generic. They may also be general-purpose robots which can be inserted into low-cost game-specific bodies (e.g. tanks) for the purposes of specific games.

Motion Recording and Playback

As mentioned above, a user may directly move a robot, i.e. by hand, and have the movement mirrored by a remote robot. The user may also instruct a robot to record a hand-specified movement, and then have the robot replay the recorded movement. Recording (and playback) may be initiated by depressing a button on the robot, or by providing a control input through some other interface, such as by designating a <record> zone (or <playback> zone) on a netpage with a netpage sensing device (including the robot itself), or by specifying a command by other means, such as keyboard or mouse input to a computer system.

Motion recording and playback may be provided as a generic function of the host computer system, or may be provided by specific applications. In either case recording and playback rely on already-described mechanisms. Hand-specified motion may optionally be subject to smoothing by the computer system before playback, and a robot may also be instructed to follow a path at a different speed to the varying speed associated with the original hand-specified motion.

Robotic Viewer

A netpage viewer is a device which, when placed on a netpage, provides a registered interactive view of elements of the page underlying the viewer. The viewer incorporates a netpage sensor for determining its own position and orientation relative to the netpage, and to allow it to obtain interactive content specific to the page from the netpage system. A netpage viewer is described in co-pending PCT application WO 01/41046 entitled "Viewer with Code Sensor", filed 27 Nov. 2000. A netpage viewer incorporating a printer is described in co-pending PCT application WO 01/41045 entitled "Viewer with Code Sensor and Printer", filed 27 Nov. 2000.

A netpage viewer is usefully augmented with robotic capabilities, to allow the viewer to mirror movement of a remote viewer, or to allow the viewer to display remote netpage pen input on its display, wherever the input may appear on the page. The robotic netpage viewer will move to the area of the page where input is occurring, to allow the input to be displayed in registered fashion. This is particularly useful in a collaborative markup context as described above. The user may at any time move the viewer to a different part of the page to view earlier markup. If the viewer incorporates a printer, then remote (and local) markup can be simultaneously (and persistently) transferred to the underlying physical page.

Robot Controller

Figure 4:
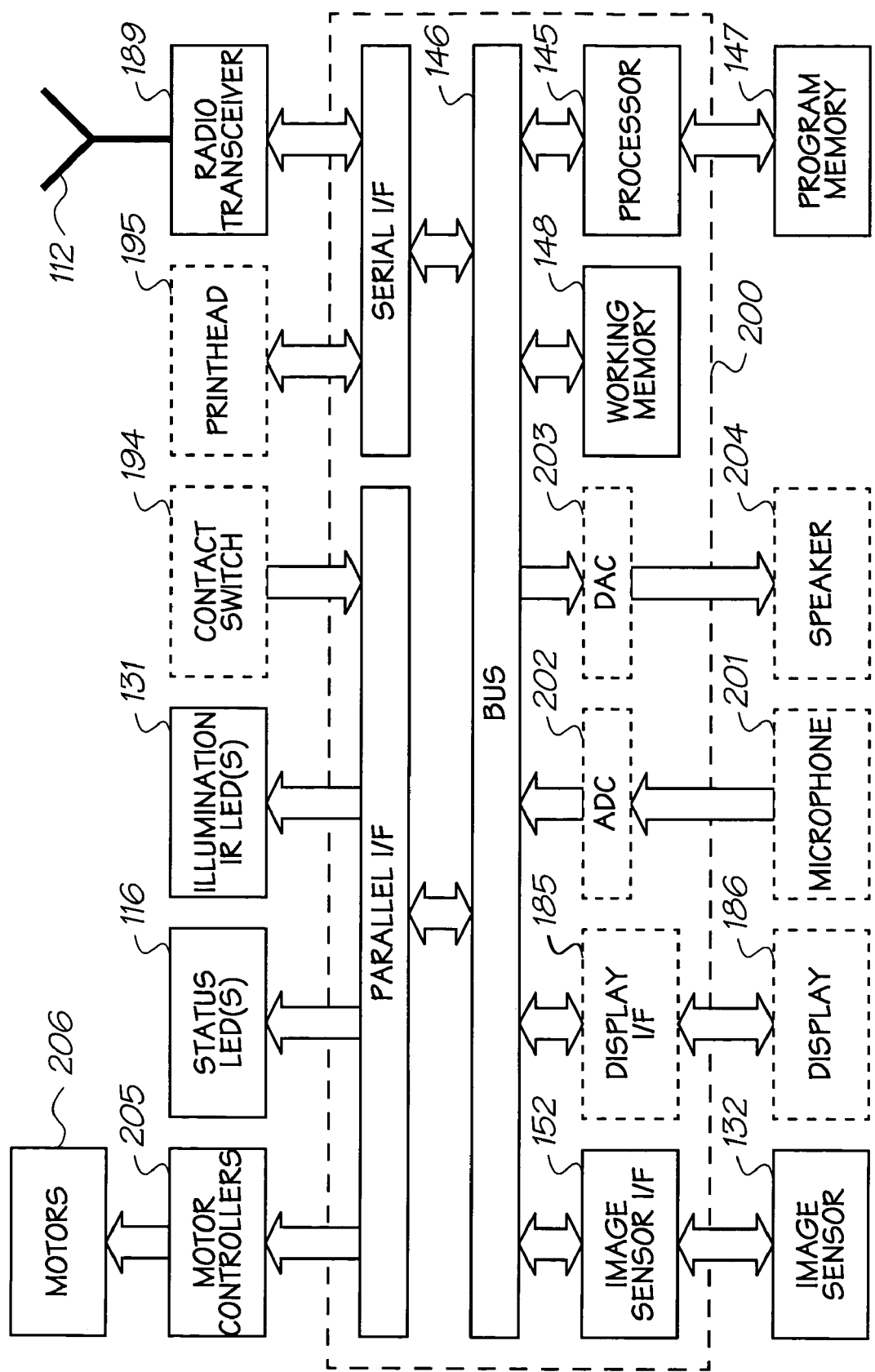
FIG. 4 shows a block diagram of a mobile robot controller 200 and its associated peripherals, according to a preferred form of the present invention.

FIG. 4 shows a block diagram of the robot controller 200 and its associated peripherals. The integrated controller chip incorporates a processor 145 connected to a number of other components via a shared bus 146, including a working memory 148 (such as an SRAM). An off-chip non-volatile memory 147 (such as a flash memory) holds the fixed robot program and other persistent data. The controller includes a parallel interface for controlling the motor controllers 205, status LED(s) 116, and illumination LED(s) 131, and for sensing the optional contact switch 194. It includes a serial interface for communicating with a host computer (and/or other robots) via the radio transceiver 189, and for controlling the optional printhead 195. It includes an image sensor interface 152 for the netpage sensor's image sensor 132, an optional display interface 185 for the display 186, an optional ADC 202 for the microphone 201, and an optional DAC 203 for the speaker 204.

Robot Communication Flow

Figure 5:
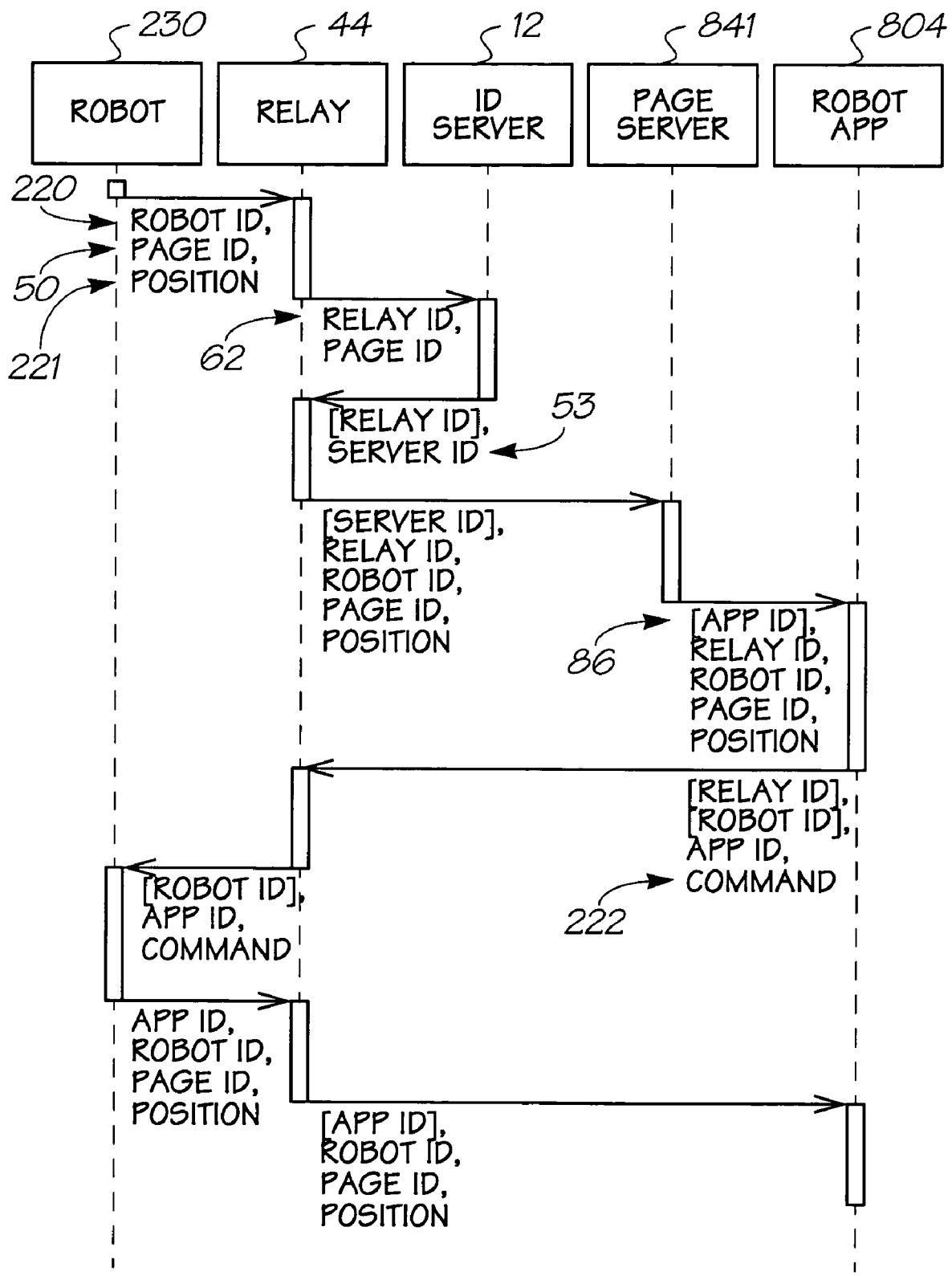
FIG. 5 shows a communication flow between the mobile robot 230 and associated networked entities.

FIG. 5 shows a possible communication flow between a netpage robot 230 and associated networked entities in the context of the netpage system.

When the robot is placed on a netpage, its goal is to notify its presence to a corresponding robot control application 804, and begin receiving commands from the application. The robot typically has short-range wireless connectivity with a relay device 44, which itself typically has longer-range network connectivity to netpage system servers via wired LAN, WAN or a longer-range wireless link. The relay device may be a mobile phone, as described in co-pending PCT application WO 00/72286 entitled "Relay Device", filed 24 May 2000; an interactive netpage printer, as described in co-pending PCT application WO 02/42894 entitled "Interactive Printer", filed 26 Nov. 2001; etc.

The robot transmits its initial position report to the relay, including its robot id 220, the netpage id 50 of the page on which it finds itself, and its position (and orientation) 221 on the page. The relay is able to determine, with reference to one or more id servers 12, the server id 53 of the page server 841 which "owns" the page description of the page. Alternatively, the robot may itself be able to determine the server id 53 from the id server(s) 12, transparently via the relay 44. The robot may also implicitly incorporate the relay function if it has its own longer-range network connectivity.

The relay (or robot) then forwards the position report to the page server 841. The page server in turn determines which application 804 to forward the position report to. In the general netpage scheme, this consists of hit-testing the robot position against the various interactive elements embedded in the description of the page. For the purposes of robot control, all robot movement is usefully forwarded directly to the application without further interpretation by the page server. It is also possible to dispense with the page server entirely, and forward a robot position report directly from the robot (or relay) to an application as identified by the id server(s), or even as identified directly by the page id 50 embedded in the original page. Note that while the ids used in the netpage system are typically described as "pure" ids which do not support routing per se, it is also possible, for example, for these ids to be partial or complete Internet Protocol (IP) addresses, either in 32-bit (IPv4) or 128-bit (IPv6) form, thus directly supporting routing.

The application 804 eventually receives the robot position report by one of these mechanisms, and then interprets the position report with reference to the layout and semantics of the page identified by the page id 50. Since the application may be specific to a particular page layout (e.g. to the chess board), it may be able to assume the layout and simply use the page id to index a particular instance (e.g. a particular in-progress chess game). The application is then able to send commands 222 directly (or indirectly) to the robot, and receive further position input from the robot.

As mentioned earlier, there are many possible variations on this architecture, including downloading application logic into one or more robots, and distributed peer-to-peer robot control.

Application Context Class Diagram

Figure 6:
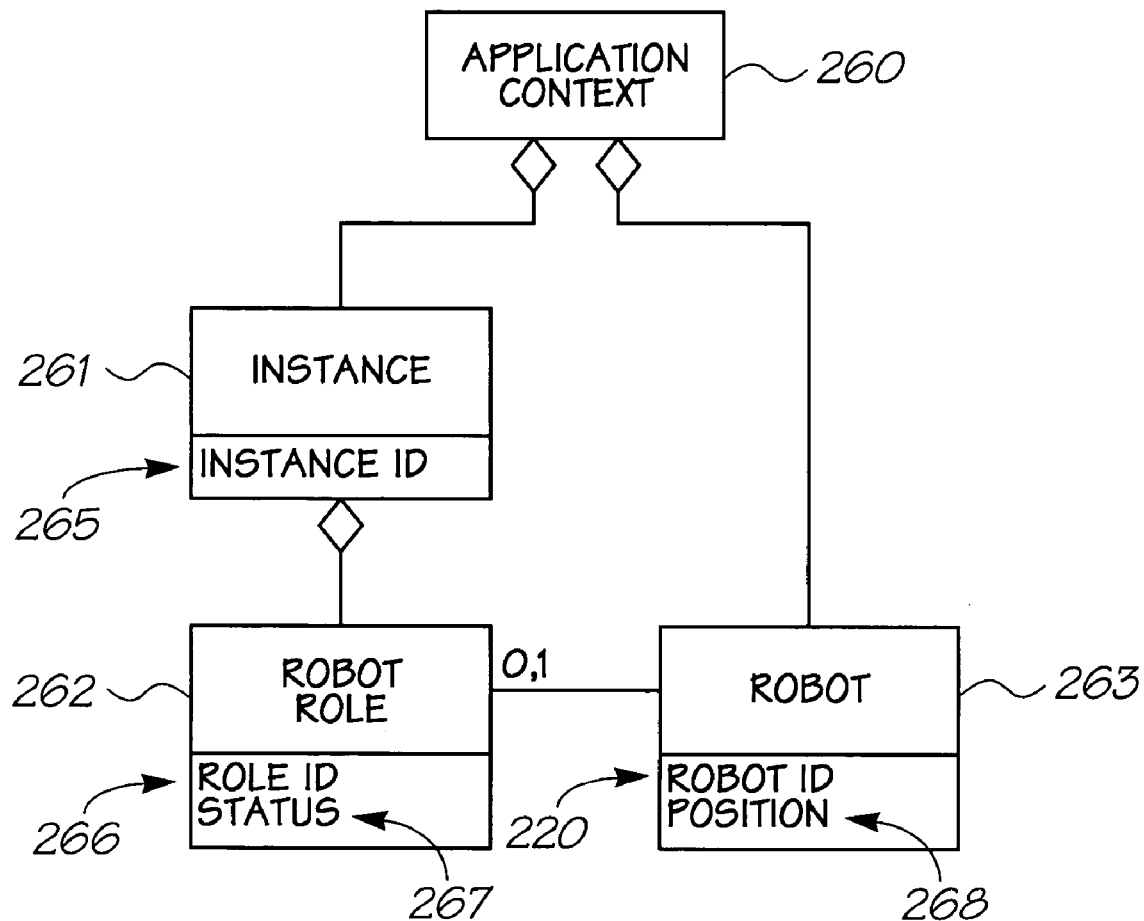
FIG. 6 shows an application context class diagram, in UML notation, for a robot control application according to a preferred form of the present invention.

FIG. 6 shows a generic application context class diagram, in UML notation, for a robot control application. The overall context 260 (e.g. corresponding to the chess application) includes a number of individual instances 261 (e.g. corresponding to individual chess games), each of which includes a number of robot roles 262 (e.g. corresponding to individual chess pieces' roles). The context also includes a number of known robots 263, each of which may optionally have been assigned a role 262. Each instance 261 is identified by an instance id 265. The instance id may correspond to the netpage id of the corresponding page, or may correspond to a transaction id, embedded in the page description of the corresponding page, which gets forwarded to the application during robot interactions. Each role 262 is identified by a role id 266, and has a status 267 (e.g. indicating whether a chess piece is still in play or has been captured). Each robot 263 is identified by a robot id 220, i.e. the robot id of the corresponding physical robot 230, and a current position 269 derived from the most recent position 221 reported by the robot.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate.

The invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made by one of ordinary skill in the art without departing from the scope of the present invention.

The invention claimed is:

1. A robot adapted to operate in association with an interface surface having disposed therein or thereon coded data indicative of an identity of the interface surface and of a plurality of reference points of the interface surface, the robot comprising:
   (1) movement means to allow the robot to move over the interface surface;
   (2) a sensing device which senses at least some of the coded data and generates indicating data indicative of the identity of the interface surface and of a position of the robot on the interface surface;
   (3) communication means to:
      (A) transmit the indicating data to a computer system, the computer system programmed to select and execute a computer application based on at least the identity of the interface surface; and, (B) receive movement instructions from the selected computer application, whereby, the behaviour of the robot is at least in part controlled by the selected computer application.

2. A robot adapted to operate in association with an interface surface having disposed therein or thereon coded data indicative of an identity of the interface surface and of a plurality of reference points of the interface surface, the robot comprising:
- (1) movement means to allow the robot to move over the interface surface;
- (2) a sensing device which senses at least some of the coded data and generates indicating data indicative of the identity of the interface surface and of a position of the robot on the interface surface;
- (3) a processor adapted to:
  - (C) select and execute a computer application based on at least the identity of the interface surface; and,
  - (D) generate movement instructions;

whereby, the behaviour of the robot is at least in part controlled by the selected computer application.

3. The robot as claimed in claim 2, wherein the processor is programmed to select the computer application from a plurality of computer applications stored in at least one memory of the robot.

4. The robot as claimed in claim 2, further including a communications means to:
- (A) transmit data indicative of at least the identity of the interface surface to a computer system, the computer system programmed to select the computer application based on at least the identity of the interface surface; and,
- (B) receive the computer application from the computer system.

5. The robot as claimed in claim 1 or claim 4, wherein the robot has a unique robot identifier which is adapted to distinguish the robot from other robots.

6. The robot as claimed in claim 5, wherein the computer system is adapted to receive the robot identifier.

7. The robot as claimed in claim 1 or claim 4, wherein the indicating data is transmitted to the computer system by a wireless signal.

8. The robot as claimed in claim 7, wherein the computer system is adapted to receive the indicating data via a relay device in wireless communication with the robot.

9. The robot as claimed in claim 8, wherein the relay device is a mobile or cellular telephone.

10. The robot as claimed in claim 7, wherein the wireless signal is a radio-frequency signal.

11. The robot as claimed in claim 1 or claim 2, wherein the plurality of reference points are two-dimensional co-ordinate positions on the interface surface.

12. The robot as claimed in claim 1 or claim 2, wherein the coded data is substantially invisible to an unaided human eye.

13. The robot as claimed in claim 12, wherein the coded data is printed in infrared absorptive ink.

14. The robot as claimed in claim 13, wherein the sensing device includes at least one infrared illumination device and an area image sensor.

15. The robot as claimed in claim 1 or claim 2, wherein the interface surface is a netpage.

16. The robot a claimed in claim 1 or claim 4, wherein the robot includes an image or video display.

17. The robot as claimed in claim 16, wherein the display is able to show an image or video of a remote operator of the robot.

18. The robot as claimed in claim 1 or claim 2, wherein the robot includes a speaker for generating audio.

19. The robot as claimed in claim 1 or claim 2, wherein the robot includes a microphone for capturing audio.

20. The robot as claimed in claim 1 or claim 4, wherein the movement of the robot mirrors the movement of a remote device communicating with the computer system.

21. The robot as claimed in claim 1 or claim 2, wherein the computer application controls play of a game and the robot behaviour is characteristic of a piece in the game.

22. The robot as claimed in claim 21, wherein more than one robot participates in the game.

23. The robot as claimed in claim 1 or claim 4, wherein the robot can be remotely controlled by a user.

24. The robot as claimed in claim 1 or claim 2, wherein the interface surface is a game-playing surface having markings that are visible to a normal unaided human eye.

25. The robot as claimed in claim 24, wherein the visible markings include at least one game-control button.

26. The robot as claimed in claim 25, wherein the at least one game-control button includes resume, resign, new game, gather or the like options.

27. The robot as claimed in claim 24, wherein the game-playing surface is a chess board.

28. A robot adapted to operate in association with an interface surface having disposed therein or thereon coded data indicative of an identity of the interface surface and of a plurality of reference points of the interface surface, the robot comprising:
- (1) at least one motor and at least one drive mechanism to propel the robot over the interface surface;
- (2) at least one motor controller to control the motor;
- (3) a sensing device which senses at least some of the coded data and generates indicating data indicative of the identity of the interface surface and of a position of the robot on the interface surface;
- (4) a radio transceiver to:
  - (A) transmit the indicating data to a computer system, the computer system programmed to execute a program based on at least the identity of the interface surface; and,
  - (B) receive movement instructions from the program;

whereby, the behaviour of the robot is substantially controlled by the program.

29. The robot as claimed in claim 28, wherein the program is selected from a plurality of programs on the computer system.

30. A robot adapted to operate in association with an interface surface having disposed therein or thereon coded data indicative of an identity of the interface surface and of a plurality of reference points of the interface surface, the robot comprising:
- (1) at least one motor and at least one drive mechanism to propel the robot over the interface surface;
- (2) at least one motor controller to control the motor;
- (3) a sensing device which senses at least some of the coded data and generates indicating data indicative of the identity of the interface surface and of a position of the robot on the interface surface;
- (4) a processor to:
  - (C) select and execute a program based on at least the identity of the interface surface; and,
  - (D) generate movement instructions;

whereby, the behaviour of the robot is substantially controlled by the program.

31. The robot as claimed in claim 30, wherein the processor is programmed to select the program from a plurality of programs stored in at least one memory of the robot.

32. The robot as claimed in claim 30, further including a radio transceiver to:
  (A) transmit data indicative of at least the identity of the interface surface to a computer system, the computer system programmed to select the program based on at least the identity of the interface surface; and,
  (B) receive the program from the computer system.

33. A system for controlling the movement of a robot, the system comprising:
  (1) an interface surface having disposed therein or thereon coded data indicative of an identity of the interface surface and of a plurality of reference points of the interface surface;
  (2) a computer system, the computer system programmed to select and execute a computer application based on at least the identity of the interface surface, the computer system able to communicate with the robot;
  (3) the robot adapted to operate in association with the interface surface, the robot including:
    (A) movement means to allow the robot to move over the interface surface;
    (B) a sensing device which senses at least some of the coded data and generates indicating data indicative of the identity of the interface surface and of a position of the robot of the interface surface; and,
    (C) communication means to transmit the indicating data to the computer system and receive movement instructions from the selected computer application;
  whereby, the behaviour of the robot is at least in part controlled by the selected computer application.

34. A method of controlling the movement of a robot, the robot adapted to operate in association with an interface surface having disposed therein or thereon coded data indicative of an identity of the interface surface and of a plurality of reference points of the interface surface, the robot additionally provided with movement means to allow the robot to move over the interface surface and a sensing device which senses at least some of the coded data and generates indicating data indicative of the identity of the interface surface and of a position of the robot on the interface surface, the method including the steps of:
  the robot transmitting the indicating data to a computer system, the computer system programmed to select and execute a computer application based on at least the identity of the interface surface; and,
  the robot receiving movement instructions from the selected computer application.

35. A method of controlling the movement of a robot, the robot adapted to operate in association with an interface surface having disposed therein or thereon coded data indicative of an identity of the interface surface and of a plurality of reference points of the interface surface, the robot additionally provided with movement means to allow the robot to move over the interface surface and a sensing device which senses at least some of the coded data and generates indicating data indicative of the identity of the interface surface and of a position of the robot on the interface surface, the method including the steps of:
  the robot processing the indicating data in a processor, the processor executing a program based on at least the identity of the interface surface; and,
  the processor providing movement instructions from the program.

* * * * *